United States Patent [19]

Dye et al.

[11] Patent Number: 5,834,053
[45] Date of Patent: Nov. 10, 1998

[54] BLUE LIGHT EMITTING THIOGALLATE PHOSPHOR

[75] Inventors: Robert C. Dye; David C. Smith, both of Los Alamos, N. Mex.; Christopher N. King, Portland; Richard T. Tuenge, Hillsboro, both of Oreg.

[73] Assignee: The Regents of the University of California, Los Alamos, N. Mex.

[21] Appl. No.: 814,953

[22] Filed: Mar. 10, 1997

Related U.S. Application Data

[62] Division of Ser. No. 348,266, Nov. 30, 1994, abandoned.
[51] Int. Cl.[6] ...................................................... B65D 5/06
[52] U.S. Cl. .............................. 427/66; 427/64; 427/162; 427/165; 427/255.2
[58] Field of Search .............................. 427/66, 162, 165, 427/255.2, 64

[56] References Cited

U.S. PATENT DOCUMENTS 5,505,986   4/1996   Velthaus et al. ........................... 427/66

*Primary Examiner*—Janyce Bell
*Attorney, Agent, or Firm*—Bruce H. Cottrell

[57] ABSTRACT

A crystalline blue emitting thiogallate phosphor of the formula $RGa_2S_4:Ce_x$ where R is selected from the group consisting of calcium, strontium, barium and zinc, and x is from about 1 to 10 atomic percent, the phosphor characterized as having a crystalline microstructure on the size order of from about 100 Å to about 10,000 Å is provided together with a process of preparing a crystalline blue emitting thiogallate phosphor by depositing on a substrate by CVD and resultant thin film electroluminescent devices including a layer of such deposited phosphor on an ordinary glass substrate.

6 Claims, 5 Drawing Sheets

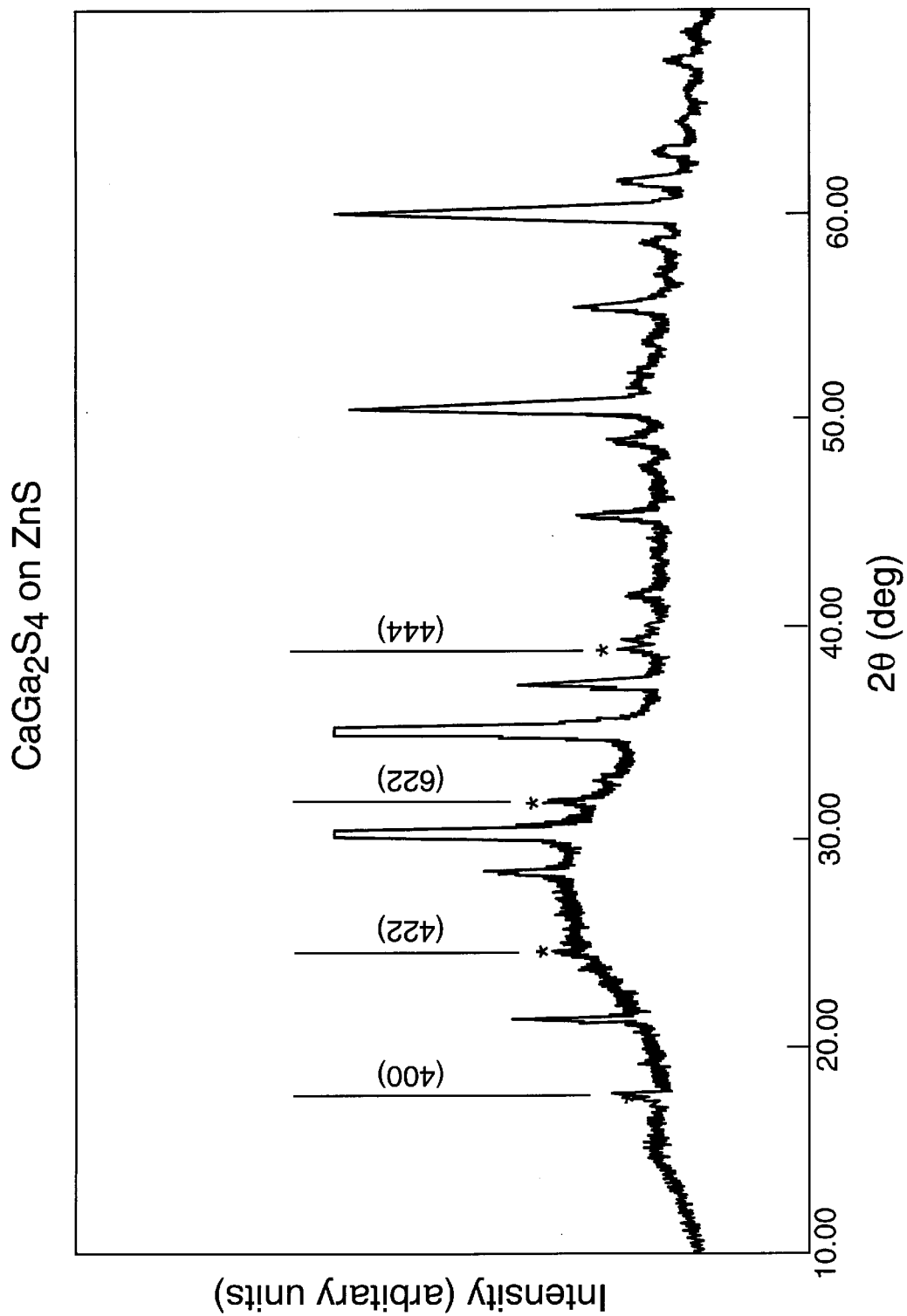

BLUE LIGHT EMITTING THIOGALLATE PHOSPHOR

This application is a divisional of application(s) application Ser. No. 08/348,266 filed on Nov. 30, 1994, now abandoned.

FIELD OF THE INVENTION

The present invention relates to blue light emitting thiogallate phosphors, more particularly to crystalline blue light emitting thiogallate phosphors, to a chemical vapor deposition process for preparing the same, and to thin film devices prepared from the chemical vapor deposition process. This invention is the result of a contract with the Department of Energy (Contract No. W-7405-ENG-36).

BACKGROUND OF THE INVENTION

In the design of thin film electroluminescent (TFEL) panels which are matrix addressed it has long been a desired object to produce a full color panel. Considerable progress has been made in the development of red and green phosphors for such multi-color electroluminescent displays. However, it has been difficult to produce a phosphor capable of emitting blue light of the required chromaticity and intensity, and yet remain chemically stable in the TFEL environment.

Thiogallates have been used in the past in connection with direct current electroluminescent (DCEL) powder devices as reported in Vecht, "Developments in Electroluminescent Panels," *Journal of Crystal Growth* 59 (1982) pp. 81–97. Thiogallates, however, are ternary compounds and had not generally been considered practical for alternating current thin film electroluminescent (ACTFEL) use because of the difficulty in maintaining proper stoichiometry in the preparation of the phosphor film.

U.S. Pat. No. 5,309,070 addresses the problem of using thiogallates and describes a useful blue emitting thiogallate phosphor. Unfortunately, the described process uses a sputtering technique to prepare non-crystalline or amorphous thiogallate phosphors such as $SrGa_2S_4$:Ce or $CaGa_2S_4$:Ce followed by a necessary annealing or thermal processing process after the sputter deposition to promote crystal growth of the thiogallate material. The necessity of such an annealing step requires the use of special transparent substrates, i.e., special types of glass such as a high temperature glass-ceramic substrate having a maximum operating temperature of about 850° C. Additionally, a zinc sulfide (ZnS) layer was required to protect the sputtered thiogallate phosphor layer from oxidation during the annealing stage and crystal growth.

Inoue et al., in a preprint from "Proceedings of the Society for Information Display" (1994), similarly describe the growth of thin films of $SrGa_2S_4$:Ce by molecular beam epitaxy. In molecular beam epitaxy, sources of precursor materials are evaporated by heating onto a target substrate. While this was a successful laboratory scale demonstration, molecular beam epitaxy is rarely scalable to a commercial production line because of low growth rate and small deposition area.

It is an object of this invention to provide a low temperature process for preparing an as-deposited crystalline, blue-emitting thiogallate phosphor thereby eliminating a high temperature annealing step and allowing the use of ordinary glass as substrates.

It is a further object of this invention to provide a blue emitting thiogallate phosphor having a crystalline microstructure on the size order of from about 100 Å to about 10,000 Å.

Yet a further object of this invention is to provide a thin film laminate structure including the as-deposited crystalline thiogallate phosphor upon an ordinary glass substrate subject to strain or warping at temperatures above about 700° C. which can yield the requisite amount of blue light necessary to produce a full color thin film EL device.

SUMMARY OF THE INVENTION

To achieve the foregoing and other objects, and in accordance with the purposes of the present invention, as embodied and broadly described herein, the present invention provides a crystalline blue emitting thiogallate phosphor of the formula $RGa_2S_4$:$Ce_x$ where R is selected from the group consisting of calcium, strontium, barium and zinc, and x is from about 1 to about 10 atomic percent, said phosphor characterized as having a crystalline microstructure on the size order of from about 100 Å to about 10,000 Å.

The present invention further provides a process of preparing a crystalline blue emitting thiogallate phosphor of the formula $RGa_2S_4$:$Ce_x$ where R is selected from the group consisting of calcium, strontium, barium, zinc and mixtures thereof, and x is from about 1 to about 10 atomic percent, the process including forming a gaseous mixture of a sulfur source and metallo-organic precursors, the metallo-organic precursors containing the metals R, Ga, and Ce and the metallo-organic precursors present in stoichiometric amounts sufficient to yield the thiogallate phosphor, and, exposing the gaseous mixture to a substrate at a temperature sufficiently high to deposit from the gaseous mixture a layer of the thiogallate phosphor having a crystalline microstructure.

The present invention also provides an AC thin film electroluminescent device including a front electrode set deposited on a transparent substrate, said transparent substrate comprised of a glass having a strain point or warping temperature of greater than about 700° C., a rear electrode set, a thin film laminate sandwiched between said front and rear electrode sets, said thin film laminate including at least a pair of insulating layers sandwiching a crystalline thiogallate phosphor layer having the chemical formula: $RGa_2S_4$:Ce, where R is selected from the group of calcium, strontium, zinc and barium.

BRIEF DESCRIPTION OF THE DRAWINGS

FIG. 5 shows an X-ray diffraction pattern for $CaGa_2S_4$ deposited by CVD upon the ZnS layer of a ZnS/ITO/ATO/glass substrate.

DETAILED DESCRIPTION

Figure 1:
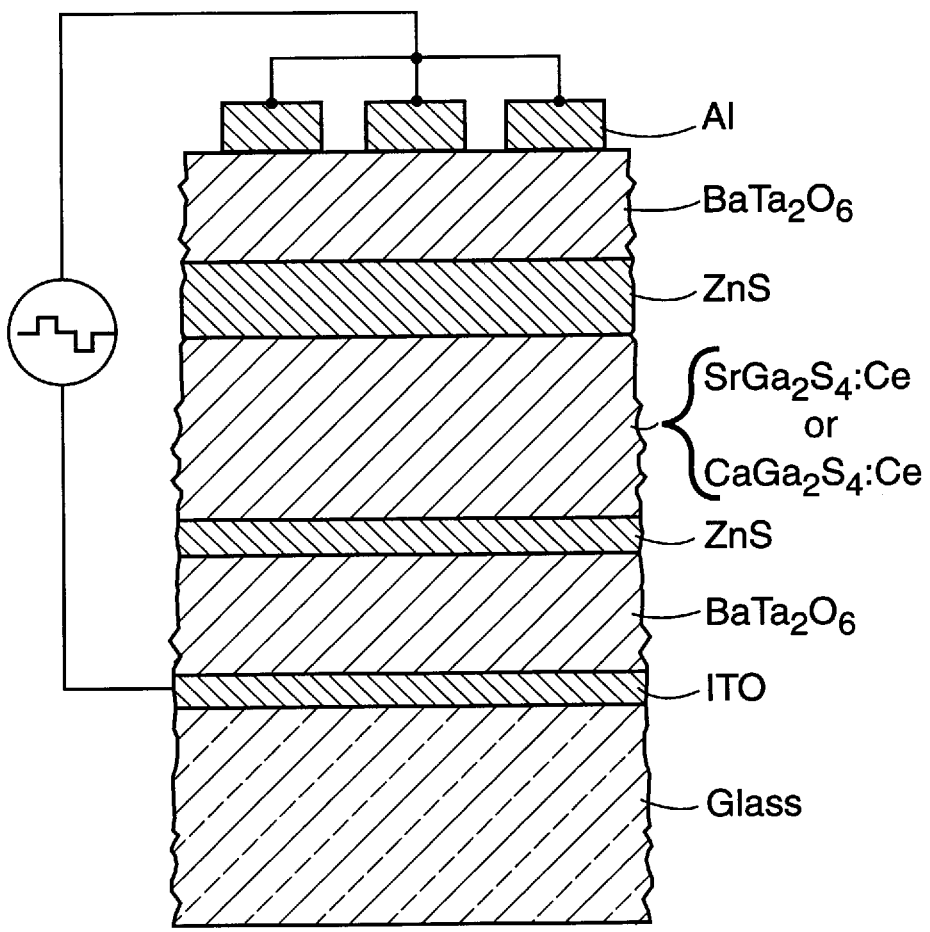
FIG. 1 is a partial side cut-away view of a thin film electroluminescent device employing the as-deposited crystalline thiogallate phosphor of the present invention.

According to the present invention, an alternating current thin film electroluminescent panel can include sets of orthogonally disposed top and bottom electrode layers sandwiching an electroluminescent laminate which includes an electroluminescent phosphor layer sandwiched between at least a pair of insulators.

The electroluminescent phosphor layer is comprised of a group II metal thiogallate with a rare earth dopant. The general chemical formula is $RGa_2S_4$:Ce, where R is selected from the group of magnesium, calcium, strontium, barium or zinc, preferably calcium, strontium and barium. Cerium (Ce) serves as an activator dopant. For blue emission in a thin film electroluminescent device, cerium is the preferred activator dopant. For other color emissions, other activator dopants such as europium or terbium may be used. The activator dopant is generally added to the group II metal thiogallate in amounts of from about 1 to about 10 atomic percent, preferably from about 2 to about 8 atomic percent.

A thin film electroluminescent panel in accordance with the present invention can include a glass substrate which supports a transparent conducting material such as indium tin oxide (ITO) electrode layer. Deposited on top of this electrode layer is a layer of a dielectric material such as barium tantalate ($BaTa_2O_6$), strontium titanate ($SrTiO_3$), a multilayer structure of $Al_2O_3$ or $TiO_2$ (($Al_2O_3$/$TiO_2$) including several layers to make up the desired thickness, such multilayer dielectric hereinafter referred to as ATO) or barium titanate ($BaTiO_3$), the layer of dielectric material having a thickness of around 3000 Å. A layer of zinc sulfide (ZnS) which is between 100 Å and 500 Å thick is deposited on top of the dielectric layer. Next, a layer of the thiogallate phosphor is deposited atop this ZnS layer. The thiogallate phosphor layer is formed by chemical vapor deposition from metallo-organic or organometallic precursors. The thiogallate layer can be covered with a thicker ZnS layer of between about 1000 Å to about 2000 Å thick. Optionally, no second layer of ZnS is needed. A second dielectric insulator layer about 3000 Å thick is placed atop the second ZnS layer. The top rear electrode layer is formed of electrodes made of aluminum.

By "metallo-organic" is meant a material including a metal atom and organic ligands but without any metal-carbon bonds. By the term "organometallic" is meant a material including a metal atom and organic ligands and with at least one metal-carbon bond. Generally, either type of precursor, i.e., an organometallic precursor or a metallo-organic precursor, including the necessary metal atom can be used in practicing the present chemical vapor deposition.

A chemical vapor deposition (CVD) technique is used to deposit the thiogallate phosphor layer. The chemical vapor deposition process basically requires the simultaneous deposition of $Ga_2S_3$ and CaS, together with the cerium dopant. $Ga_2S_3$ can be deposited from an organometallic precursor such as triethyl gallium or a metallo-organic precursor such as gallium tris-tetramethyl heptandionate ($Ga(TMHD)_3$) in an atmosphere of a sulfur source such as $H_2S$ while CaS can be deposited from an metallo-organic precursor such as calcium bis-tetramethyl heptandionate ($Ca(TMHD)_2$) in an atmosphere of $H_2S$. Cerium can be deposited from an metallo-organic precursor such as cerium tetrakis-tetramethyl heptandionate ($Ce(TMHD)_4$). Similarly, other metals such as barium and strontium may be deposited from metallo-organic precursors such as barium bis-tetramethyl heptandionate ($Ba(TMHD)_2$) and strontium bis-tetramethyl heptandionate ($Sr(TMHD)_2$)

The chemical vapor deposition is generally conducted at low substrate temperatures, i.e., at temperatures from about 400° C. to about 600° C., preferably from about 550° C. to about 600° C. With deposition of as deposited crystalline thiogallate phosphor at these substrate temperatures, ordinary glass substrates having low melting temperatures can be used. By "ordinary glass" is meant glass that has a strain point or warps at temperatures of greater than about 700° C., for example, a glass such as Corning 7059 glass.

The first ZnS layer is of special importance. The critical function of the ZnS layer is to provide a nucleation layer and it may further act as a carrier injection layer. The ideal thickness of the first layer ranges from around 100 Å to 500 Å, while the ideal thickness for the other layer, if employed is 1000 Å to 2000 Å. If either layer is too thick there will be an excessive rise in the threshold voltage. If the ZnS layer functions as a carrier injection later during device operation, a conduction charge formed at breakdown becomes a new source of electrons for Ce ion excitation in addition to the existing sources at the ZnS/thiogallate interfaces. This serves to increase the luminance efficiency of the device.

The group II metal thiogallates are low electroluminescent efficiency phosphors. Thus, a high dielectric insulator such as 3000 Å of ATO is used to increase charge injection and to allow the use of a thicker phosphor layer without excessive increase in the operating voltage. To fully cover the phosphor layer, the ATO layer must be thicker than 2500 Å to avoid breakdown at thin spots. In addition to ATO, other high dielectric materials such as a strontium titanate/zirconate mixture can be used to achieve the same result.

The preferred structure for a thin film electroluminescent device blue-emitting device includes a glass substrate which supports a transparent electrode layer made of indium tin oxide (ITO). The substrate is then coated with an insulator film such as ATO. An electroluminescent laminate comprising a layer of calcium, strontium or barium thiogallate, the respective thiogallate doped with cerium sandwiched between two layers of ZnS is placed atop the insulator film layer such as ATO.

Alternatively, a conductive layer such as ITO or aluminum could be deposited on, e.g, silicon, then a layer of ATO, then of ZnS, then a layer of phosphor, then a layer of ATO, then another ITO as a transparent top electrode through which the phosphor could emit.

Figure 2:
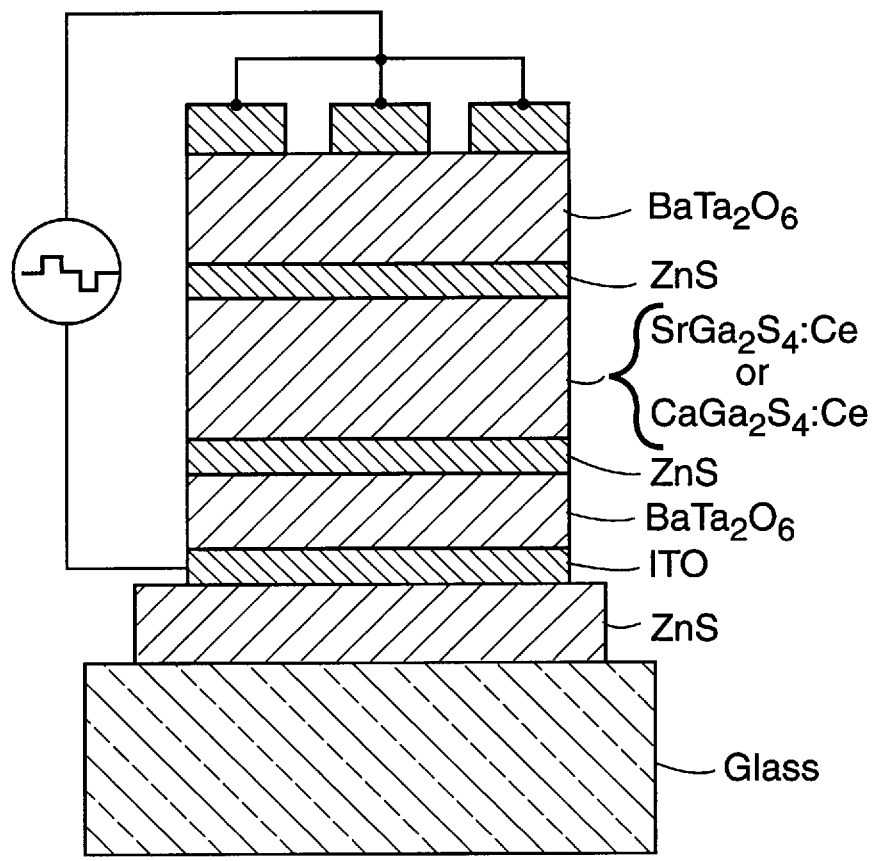
FIG. 2 is a partial side cut-a-way view of a second embodiment of the thin film electroluminescent device of the present invention.

An improved structure is shown in FIG. 2. It is known that the films deposited by a sputtering technique tend to have a fine grain structure and hence a smooth surface. In such cases a large amount of the light generated inside the thiogallate film can be lost due to internal reflection. To remedy this effect a light out-coupling layer can be used to enhance the light emission from the front surface. Such a light out-coupling layer can comprise a thick layer (about 7500 Å) of ZnS deposited on the glass substrate. At this thickness the ZnS layer will normally have a roughened surface, and the entire remaining film stack will conform to the roughened surface as it is deposited over the thick ZnS layer. This structure can provide an improvement of as much as 50% in the luminance of thiogallate blue thin film electroluminescent devices. For example, such a structure can produce 25 fl at 1000 Hz for calcium thiogallate devices.

In addition to a blue emission AC thin film electroluminescent device, a green emission may be produced by substituting europium (Eu) dopants for cerium (Ce) dopants. A device fabricated from $SrGa_2S_4$:Eu is known to deliver a luminance of 8 fL at 60 Hz and its chromaticity is x=0.25, y=0.67 which is better than those of existing ZnS:Tb green thin film electroluminescent devices.

Figure 3:
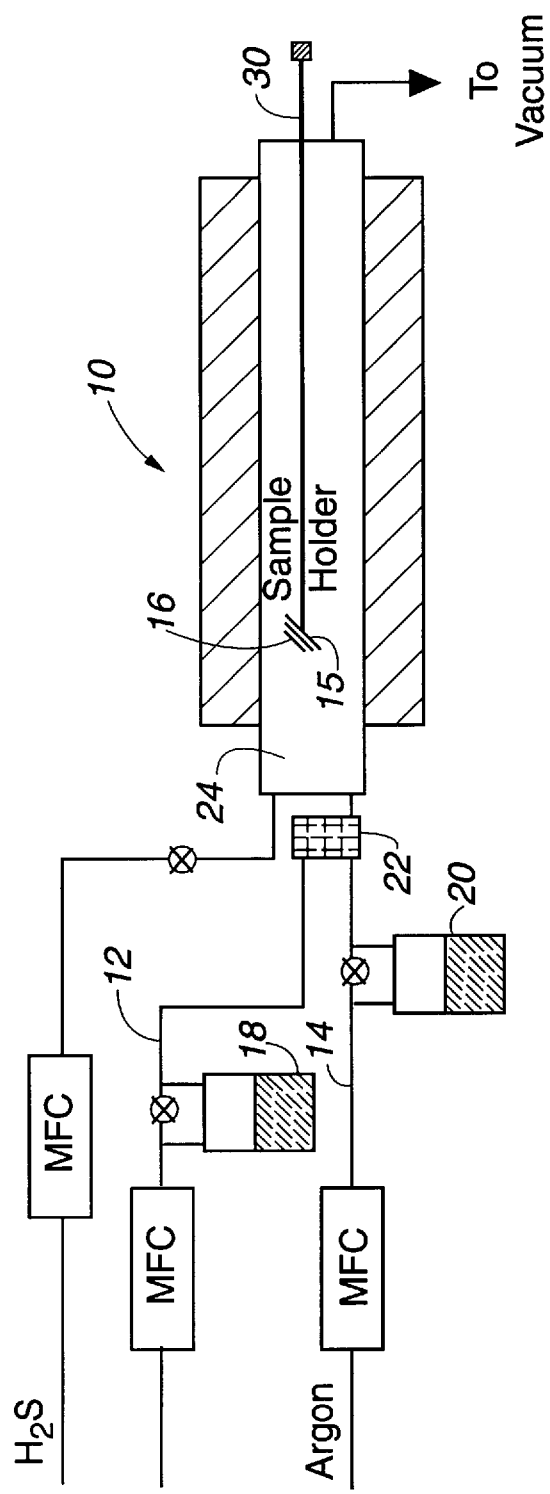
FIG. 3 is a schematic diagram of an apparatus used in the chemical vapor deposition process of the present invention.

Among the reactors useful in the present deposition process are included two separate CVD reactors, each of a warm wall-hot stage configuration. The first type reactor is shown in FIG. 3 and is a horizontal tube reactor 10 with parallel gas flow at 12 and 14 to the substrate 16. The reactor is preferably built completely of stainless steel (for compatibility with $H_2S$ and moderately high temperatures) with appropriate fittings such as Con-flat, VCR, and Swage-loc.

Each precursors and a carrier gas such as argon or helium are passed from a separate bubbler (bubblers 18 and 20 are shown) into a stainless steel mixing chamber 22 and finally into the deposition chamber 24 where the mixture is interdiffused with incoming $H_2S$ as a sulfur source. Alternatively, the precursors and the carrier gas can be mixed with the $H_2S$ prior to entry into the deposition chamber. The gas inlets are coaxial with the deposition chamber. The reactor is fitted with a load-lock arrangement 26 downstream of the deposition chamber to allow transfer of samples without venting the reactor to air. The equipment can also be fitted with a bypass 28 which allows the precursor/carrier gas mixture to be pumped directly out of the system and not into the deposition chamber. The substrate stage 15 can consist of a stainless steel block and preferably positions the substrate approximately 30 degrees off parallel to the gas flow. The substrate stage 15 can contain a thermocouple and cartridge heaters. The substrate stage 15 is supported and transported to the load-lock via a stainless steel rod 30. The whole system can be evacuated by a rotary vacuum pump and reactor pressure can be regulated via a butterfly valve controller.

Figure 4:
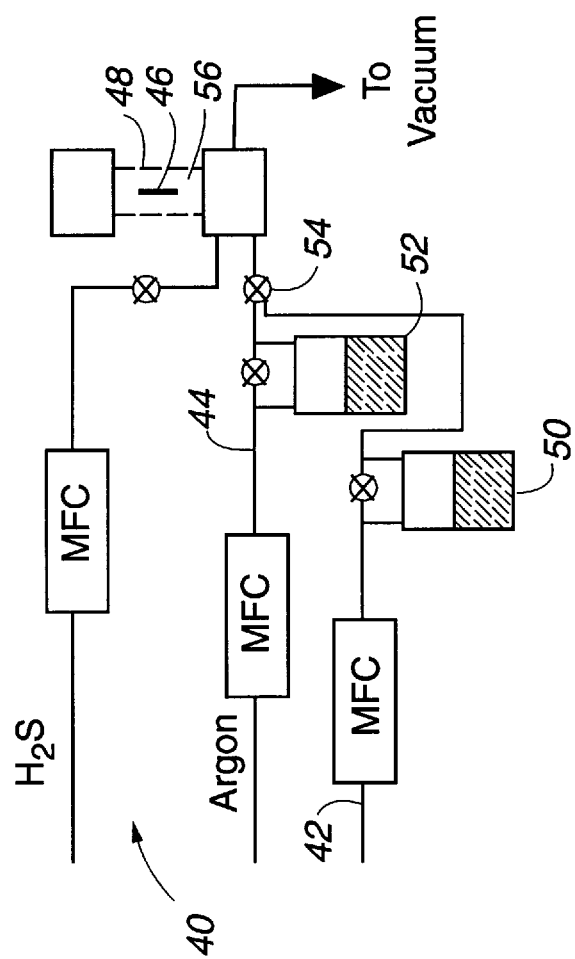
FIG. 4 is a schematic diagram of another apparatus used in the chemical vapor deposition process of the present invention.

The second type reactor is shown in FIG. 4 and is a radiant heat reactor system 40 with parallel gas flow at 42 and 44 to the substrate 46. The reactor includes a quartz window 48 for allowing the radiant heat into the system from, e.g., a quartz-halogen lamp. Each precursors and the carrier gas such as argon or helium are passed from a separate bubbler (bubblers 50 and 52 shown) into a stainless steel mixing chamber 54 and finally into the deposition chamber 56 where it is interdiffused with incoming $H_2S$. Again, the precursors and the carrier gas can be mixed with the $H_2S$ prior to entry into the deposition chamber.

The present invention is more particularly described in the following examples which are intended as illustrative only, since numerous modifications and variations will be apparent to those skilled in the art. The thin films were characterized by a variety of techniques. The degree of crystallinity and crystal morphology were established by powder or thin film X-ray diffraction. The X-ray diffraction was performed using a Rigaku Rotoflex rotating anode tube using Cu K-alpha radiation and an Inel CPS 120 position sensitive detector. The stoichiometry and thickness of the deposited layers were determined with Rutherford backscattering spectroscopy (RBS). A 2 MeV ion beam ($^4He^+$) was used in the RBS analysis. Surface characterization was studied with electron microscopy using a Philips CM30 transmission electron microscope (TEM) and a Jeol JSM-6300FXV scanning electron microscope (SEM). Routine thickness measurements were obtained using profilometry.

EXAMPLE 1

Triethyl gallium ($GaEt_3$) and calcium bis(2,2,6,6-tetramethyl-3,5-heptandionate) ($Ca(TMHD)_2$) precursors were purchased from Strem Chemical Inc. $GaEt_3$ was received in a stainless steel bubbler and was used without further purification. The $Ca(TMHD)_2$ was freshly sublimed in a water-cooled sublimation apparatus at $10^{-3}$ Torr and 220° C. and placed in a clean bubbler with all handling of the precursor carried out in an inert atmosphere of helium or argon. The gallium and calcium precursors were mixed with argon as a carrier gas prior to entry into the reaction chamber. Hydrogen sulfide gas (99.5% purity) was obtained from Matheson and ultrapure (99.995%) argon carrier gas was purchased from Air Products. The argon gas was further purified using a Purifilter filter (from Semi Gas Systems) in the gas line prior to entering the precursor bubblers. To demonstrate the pieces of the chemical vapor deposition process, triethyl gallium was mixed with $H_2S$ and entered into a reactor for about 2 minutes as in FIG. 4 with the chamber pressure at about 5 Torr and the glass substrate temperature varied between about 450° C. and 600° C. The resultant film had a stoichiometry of $Ga_2S_3$ as determined by RBS with no residual carbon. Calcium sulfide (CaS) was deposited in a reactor as in FIG. 3 from $Ca(TMHD)_2$ and $H_2S$ entered into the reactor at rates of 200 sccm and 100 sccm respectively with chamber pressure of 5 Torr onto glass substrates. The precursor was heated at from about 220° C. to about 240° C. with the substrate heated at from about 400° C. to about 600° C.

A highly crystalline film resulted as determined by X-ray diffraction. Film composition from RBS indicated a Ca:S ratio of one.

EXAMPLE 2

Simultaneous chemical vapor deposition of $Ca(TMHD)_2$ and $Ga(TMHD)_3$ to form $CaGa_2S_4$ was as follows. The $Ca(TMHD)_2$ and gallium tris(2,2,6,6-tetramethyl-3,5-heptanedionate) ($Ga(TMHD)_3$) were purchased from Stem Chemical Inc. and freshly sublimed prior to use in a water-cooled sublimation apparatus at $10^{-3}$ Torr and 170° C. The walls of the reactor shown in FIG. 3 were heated to 260° C. and the stage was loaded into the reactor via the load-lock with a Glass/ITO/ATO/ZnS multilayer substrate. This multilayer substrate included an ordinary glass layer having a strain point or subject to warping at temperatures above 700° C., an ITO layer sputtered onto the glass, an aluminum titanate (ATO) layer sputtered onto the ITO layer and a ZnS layer deposited by atomic layer epitaxy onto the ATO layer. The reactor was evacuated to $4 \times 10^{-3}$ Torr for 30 minutes. During this time, the substrate stage was heated to between about 500° C. and 600° C. The $Ca(TMHD)_2$ bubbler was heated to 240° C. and the $Ga(TMHD)_3$ bubbler was heated to 140° C. All other parts of the reactor was heated to 250° C. When the stage had reached a steady temperature, a flow of argon was passed through the reactor and the pressure was stabilized at 10 Torr. The reactor bypass was opened and the argon was diverted through the precursor bubblers at a rate of 50+/−10 sccm (standard cubic centimeters per minute) each. After allowing the precursor flow to come toga steady state over about 5 minutes, the bypass was closed and the argon/precursor mixture was diverted into the deposition chamber. $H_2S$ was introduced into the reactor at 100 sccm. Deposition time was about 30 minutes after which the stage was transferred to the lock-load and allowed to cool beneath 75° C. in an argon atmosphere before removing from the reactor. Typical film thicknesses were about 5000 Å. An X-ray diffraction pattern is shown in FIG. 5 and indicated the microcrystalline structure of the as-deposited film of $CaGa_2S_4$.

EXAMPLE 3

An identical procedure as in example 2 is used to deposit crystalline $CaGa_2S_4$:Ce as follows with the addition of an argon flow through a cerium precursor of cerium tetrakis(2, 2,6,6-tetramethyl-3,5-heptanedionate) ($(Ce(TMHD)_4)$ available from Strem Chemical Inc. and freshly sublimed prior to use in a water-cooled sublimation apparatus at $10^{-3}$ Torr and 150° C.) at 10+/−2 sccm and a bubbler temperature of about 140° C.

Although the present invention has been described with reference to specific details, it is not intended that such details should be regarded as limitations upon the scope of the invention, except as and to the extent that they are included in the accompanying claims.

What is claimed is:

1. A process for preparation of a crystalline blue emitting thiogallate phosphor of the formula $RGa_2S_4:Ce_x$ where R is selected from the group consisting of calcium, strontium, barium, zinc and mixtures thereof, and x is from about 1 to 10 atomic percent, said process comprising:

forming a gaseous mixture of a sulfur source and metallo-organic precursors, said metallo-organic precursors containing at least one of the metals R, Ga, and Ce and said metallo-organic precursors present in stoichiometric amounts sufficient to yield said thiogallate phosphor; and, exposing said gaseous mixture to a substrate at a temperature sufficiently high to deposit from said gaseous mixture a layer of said thiogallate phosphor having a crystalline microstructure.

2. The process of claim 1 wherein R is calcium and said metallo-organic precursors include calcium bis(2,2,6,6-tetramethyl-3,5-heptandionate), gallium tris(2,2,6,6-tetramethyl-3,5-heptandionate) and cerium tetrakis(2,2,6,6-tetramethyl-3,5-heptandionate).

3. The process of claim 1 wherein said temperature is from about 400° C. to about 600° C.

4. The process of claim 1 wherein said temperature is from about 400° C. to about 600° C.

5. The process of claim 1 wherein x is from about 2 to about 8 atomic percent.

6. The process of claim 1 wherein said sulfur source is hydrogen sulfide.

* * * * *